Oct. 25, 1955
H. B. REINHARDT
2,721,707
RENEWABLE HAMMER HEAD OF THE
FOUR-WAY REVERSIBLE TYPE
Filed May 1, 1953
3 Sheets-Sheet 1
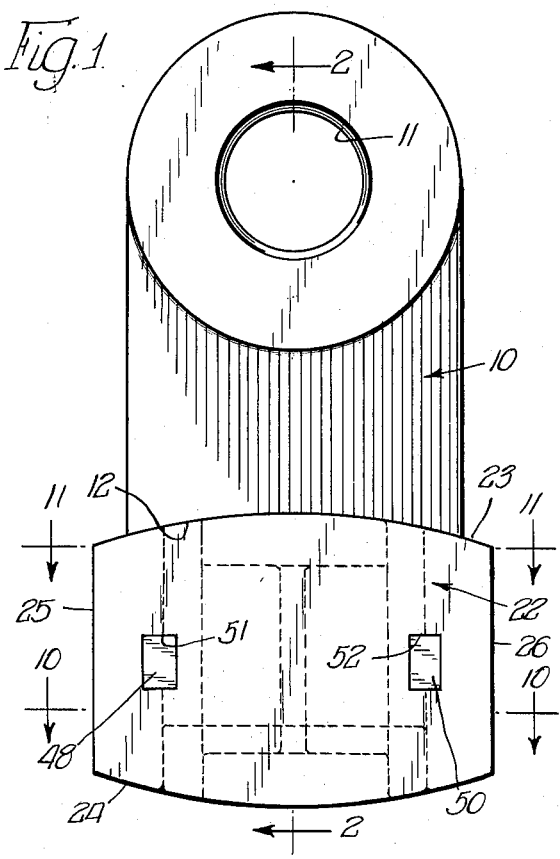
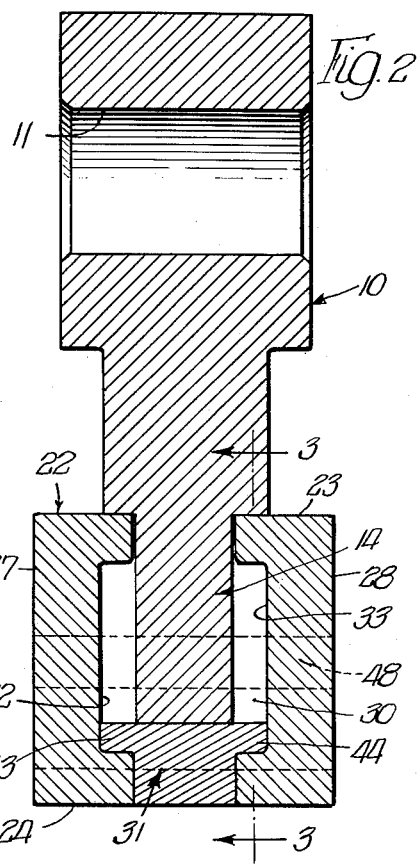
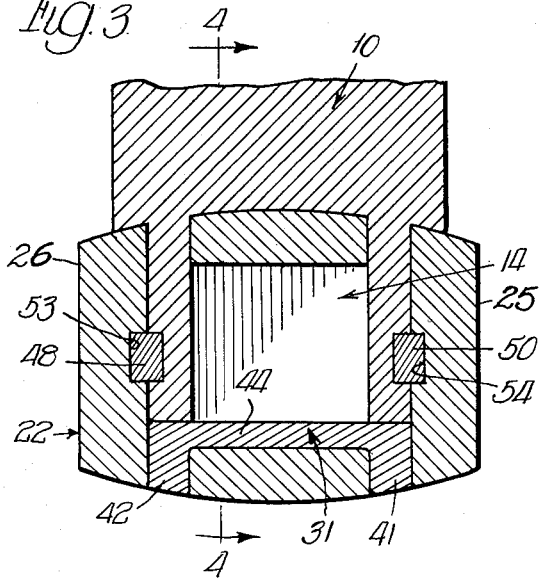
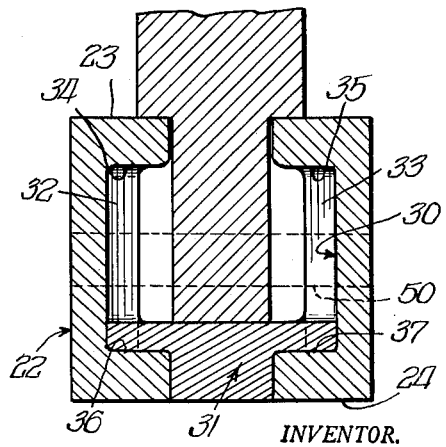
INVENTOR.
H. Brown Reinhardt,
BY Oct. 25, 1955
H. B. REINHARDT
2,721,707
RENEWABLE HAMMER HEAD OF THE
FOUR-WAY REVERSIBLE TYPE
Filed May 1, 1953
3 Sheets-Sheet 2
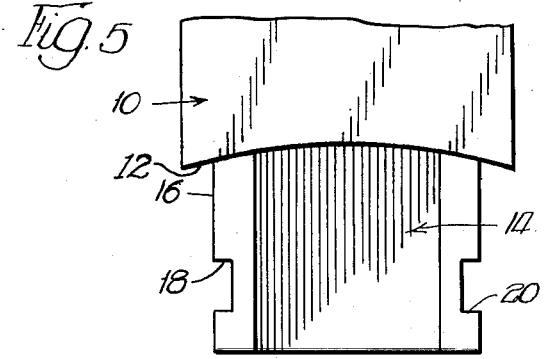
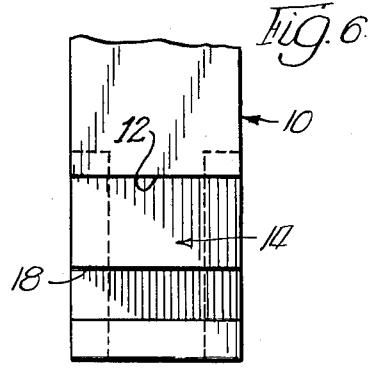
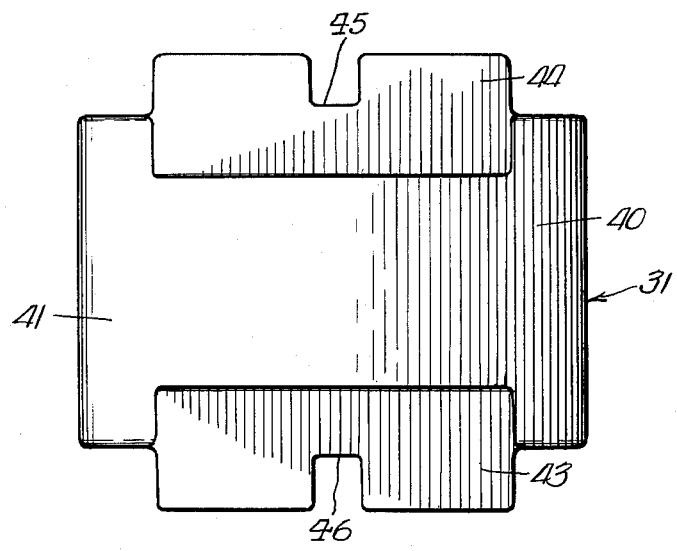
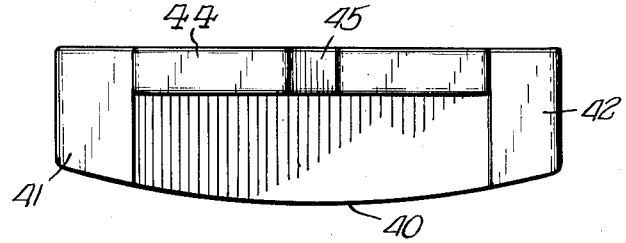
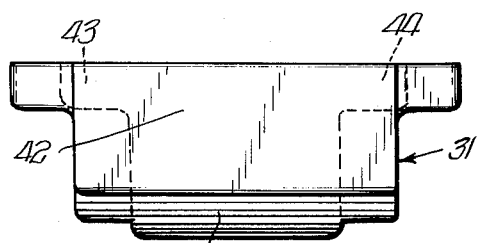
INVENTOR.
H. Brown Reinhardt,
BY Oct. 25, 1955
H. B. REINHARDT
2,721,707
RENEWABLE HAMMER HEAD OF THE
FOUR-WAY REVERSIBLE TYPE
Filed May 1, 1953
3 Sheets-Sheet 3
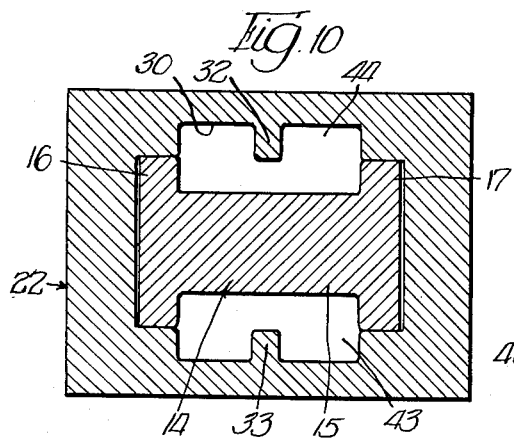
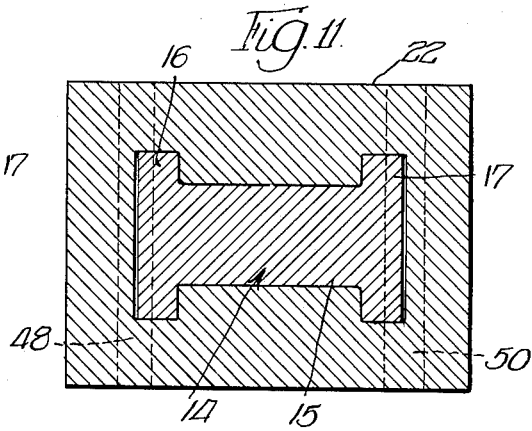
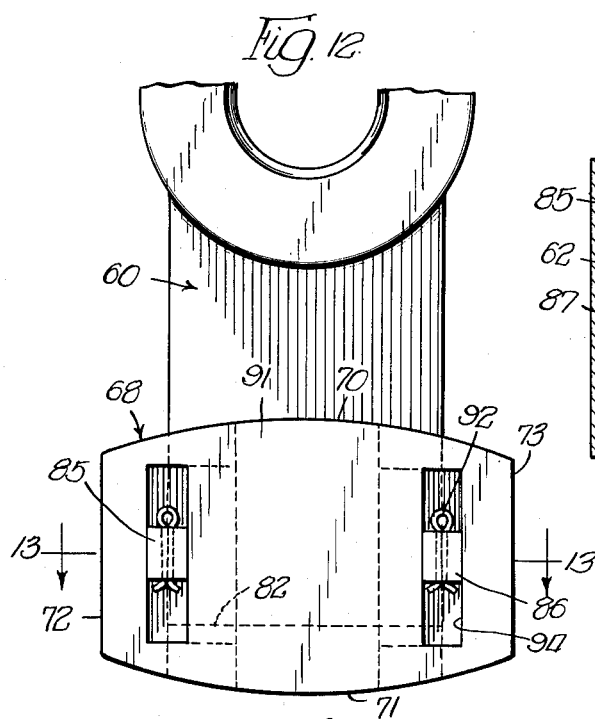
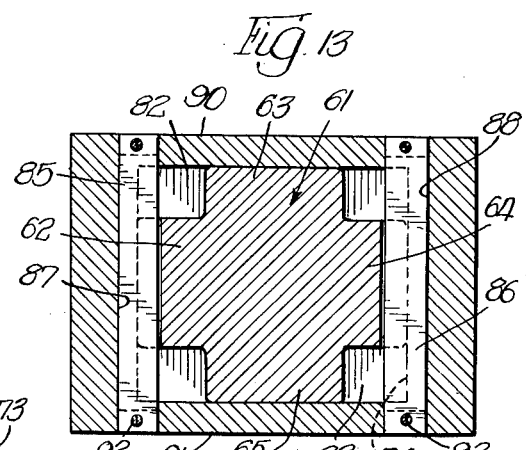
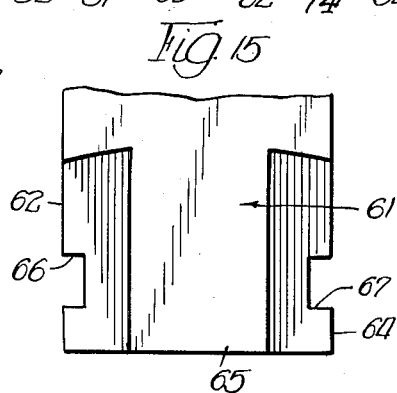
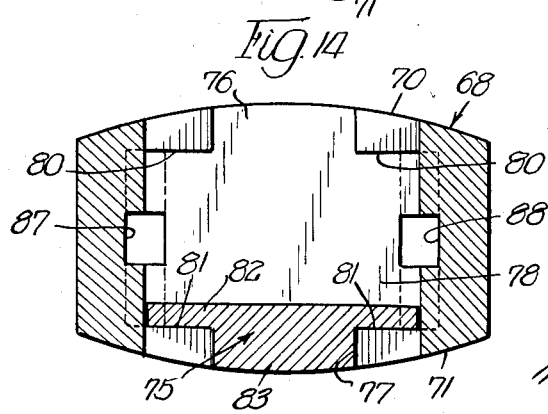
INVENTOR.
H. Brown Reinhardt,
BY

United States Patent Office 2,721,707
Patented Oct. 25, 1955

2,721,707

RENEWABLE HAMMER HEAD OF THE FOUR-WAY REVERSIBLE TYPE

Henry Brown Reinhardt, Flossmoor, Ill., assignor to American Brake Shoe Company, New York, N. Y., a corporation of Delaware Application May 1, 1953, Serial No. 352,532

7 Claims. (Cl. 241—197)

The invention relates to new and useful improvements in rotary impact hammers of the type used in rock crushers, pulverizers and similar mills, and has reference in particular to a renewable and reversible hammer head or tip whereby uniform wear on the impact edges and surfaces thereof can be obtained.

An object of the invention resides in the provision of an improved hammer structure for the purposes described consisting essentially of a shank and a hammer head and wherein the head, although removable from the shank and reversible thereon, so as to subject other surfaces to wear, is additionally constructed and arranged to provide complete protection for the end of the shank.

Hammer heads for rotary impact hammers have heretofore been designed to provide for reversibility of the element with respect to the shank so as to secure the maximum amount of wear before replacement of the head is necessary and which does not require removal of the shank from the mill. Two-way reversible hammer heads, that is, heads that are reversible side for side, have been in use for some time, and more recently hammer heads have been offered to the trade which are additionally reversible, end for end, to thus render available for use all four impact edges. However, in such hammers the end of the shank has been left exposed and subject to wear so that in time it is necessary to replace the shank.

The improved hammer head of the invention is provided with novel means for interlocking the head on the shank and which means can be removed for removing the head. In combination therewith a feature of the invention resides in the provision of means for protecting the end of the shank on which the head is mounted. Therefore, a further and more specific object of the invention is to provide a pair of keys adapted to interfit with the head and shank for locking the parts in assembled relation, and wherein the shank end is covered and protected against wear in addition to permitting four-way reversibility of the head.

Another object is to provide a bottom closure member for a four-way reversible hammer head, wherein the head is characterized by having a passage extending through the same from top to bottom, and wherein the bottom closure member is so shaped as to be positioned within the passage by having interfitting engagement with the walls thereof and is supported by shoulders or ledges provided for the purpose although the closure member can be easily inserted or removed from the passage at either end.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a side elevational view of a rotary hammer structure embodying the improved features of the invention;

Figure 2 is a vertical sectional view taken through the assembled shank and hammer head of Figure 1 substantially along line 2—2 thereof;

Figure 3 is a fragmentary vertical sectional view taken substantially along line 3—3 of Figure 2;

Figure 4 is a vertical sectional view taken substantially along line 4—4 of Figure 3;

Figure 5 is a fragmentary side elevational view showing the formation at the end of the shank on which the hammer head of Figure 1 is mounted;

Figure 6 is a fragmentary end elevational view of the shank end shown in Figure 5;

Figure 7 is a bottom plan view, on an enlarged scale, of the bottom closure member adapted for insertion in the hammer head of Figure 1;

Figure 8 is a side elevational view of the closure member of Figure 7;

Figure 9 is an end elevational view;

Figure 10 is a horizontal sectional view taken substantially along line 10—10 of Figure 1;

Figure 11 is a horizontal sectional view taken substantially along line 11—11 of Figure 1;

Figure 12 is a view in side elevation of a modified form of hammer structure coming within the invention;

Figure 13 is a horizontal sectional view taken substantially along line 13—13 of Figure 12;

Figure 14 is a vertical sectional view of the hammer head showing features of the closure member associated therewith and the passage through the head; and Figure 15 is an elevational view of the shank end on which the head of Figure 14 is mounted.

The impact hammer of the present invention is adapted for use in rotary or centrifugal disintegrators or mills wherein the hammer is fixed to a main operating shaft assembly which is adapted to rotate at high speed. Since the components of the disintegrator or mill are conventional, the present drawings disclose only the hammer shank and hammer head, the head being mounted on the shank and being releasably secured thereto by means of keys, permitting removal, however, for reversing the hammer head with respect to the shank. The numeral 10 designates a flat metal hammer shank having a hole 11 in its top end by means of which the shank is mounted on and fixedly secured to the main operating shaft assembly of the mill. The hammer shank accordingly extends radially outward of the shaft and said shank is approximately rectangular in transverse section to the ledge portion identified by numeral 12. Beyond the ledge portion 12 the terminal end 14 of the shank is fashioned in accordance with the invention to have a shape simulating the capital letter I, as is best observed by reference to Figure 11. The broad side of the shank end is presented in side elevation as a result of which the narrow central section 15, Figure 11, is disposed in a direction parallel to the rotary movement of the hammer shank. The end portions 16 and 17 have a width somewhat in excess of that of the central portion 15, thus giving to the terminal end of the shank a conventional I-beam shape. The terminal end 14 is completed by having a pair of notches or grooves formed therein, the groove 18 being formed in end portion 16 and groove 20 being formed in end portion 17. The grooves extend horizontally across the faces of the respective end portions and are adapted to receive keys for releasably attaching to said terminal end 14 a hammer head such as 22, which will now be described.

Referring more particularly to Figures 1 to 11 inclusive, the hammer head 22, adapted to have releasable securement to the end portion 14 of the shank, is substantially symmetrical with respect to the vertical and horizontal axes. The top surface 23 is rounded on the same arc as the bottom surface 24, the left end face 25 is the same size and shape as the right hand end face 26, and in a similar manner the side faces 27 and 28 are of the same shape and area. A passage 30 extends vertically through the head 22 from the surface 23 to the surface 24, the formation of the passage being symmetrical with respect to horizontal and vertical section lines, and said passage being constructed and arranged to provide supporting ledges at both the top and bottom openings to the passage for supporting a closure member, indicated in its entirety by numeral 31, which, when in place, will close the bottom end of the passage. The passage 30 has top and bottom openings, one in wall 23 and the other in wall 24, each opening being of a shape as shown in Figure 11, which substantially simulates an I beam. Thus, it is possible to insert the terminal end 14 of the shank into the end openings formed in the top and bottom surfaces of the head. Within the head the passage 30 is enlarged in a lateral direction, that is, in a direction with respect to faces 27 and 28. The reason for this enlargement, which is shown in Figures 2 and 4, is to provide shoulders or ledges for supporting the bottom closure member 31. Centrally of the passage 30 along the center line 2—2 of Figure 1 the said passage is provided with vertically extending ribs 32 and 33 on the respective sides of the portion 14 when the head is assembled thereon. The ribs 32 and 33 are provided for interlocking the bottom closure member 31 in a manner which will be understood when the shape of the bottom member is described. Accordingly, the enlargement of passage 30 on respective sides of the center ribs 32 and 33 provides top and bottom flanges which are designed solely for the purpose of supporting the bottom closure member 31. Referring to passage 30 more in detail, it will be seen that shoulders or ledges 34 and 35 are provided within head 22 below the top surface 23 of said head. In a similar manner the ledges or shoulders 36 and 37 are provided, the same being located within the head above bottom surface 24.

The structure above described can be better understood by reference to Figure 10, which is a horizontal sectional view taken on line 10—10 of Figure 1, and by reference to Figures 7, 8 and 9, which disclose constructional details of the bottom closure member 31. As previously stated, each end opening to the passage 30 is approximately of conventional I-beam shape and the bottom closure member accordingly has a shape as regards its bottom portion 40 which is exactly the same as said end openings. Thus, the bottom portion has a narrow width extending centrally of the bottom member in a longitudinal direction, and at respective ends 41 and 42 the width of portion 40 is increased. Lateral flanges are provided by the bottom closure member on each side of the narrow central portion thereof, one lateral flange being indicated by numeral 43 and the other lateral flange being indicated by numeral 44. When the bottom closure member is assembled with head 22, as shown in Figures 2 and 4, it may be assumed that flange 43 has contact with shoulder 36 and that flange 44 has contact with shoulder 37. It will be observed that each flange 43 and 44 is notched centrally thereof as at 45 and 46, the central notches being designed to receive the ribs 32 and 33 and in this manner it is possible to interlock the bottom closure member 31 to the head 22 of the hammer.

After the bottom closure member has been inserted through the passage opening in wall 23 of the head portion and has been turned within the head portion so as to enter the bottom passage opening and has been supported by the respective shoulders provided for the purpose, it is contemplated that the head portion 22 will be assembled with the shank end 14 of the hammer. For this purpose the invention contemplates the provision of interlocking keys for releasably interlocking the head portion on the shank portion. The keys 48 and 50 are rectangular in cross section and are adapted to extend horizontally through openings 51 and 52 formed in the side walls 27 and 28 of the head portion. Said openings 51 and 52 are located on the horizontal center line of the head portion so that the head portion may be reversed on the shank and the openings will align in both cases with the notches or grooves 18 and 20 provided in the end 14 of the shank, as shown in Figure 5. Figure 3 shows the keys 48 and 50 in place in the end portion 14 of the shank and also illustrates the manner in which the keys have interlocking relation with grooves in the end walls of the head portion. Groove 53, formed in end wall 25 of the head portion, may be located opposite groove 18 and a similar groove 54 is formed on the inside surface of wall 26 opposite groove 20.

The head portion 22 has a formation which is symmetrical about horizontal and vertical axes and thus the head portion can be mounted on shank 14 in four different ways so as to present all four edges for impact and wear. In other words, the head portion can be reversed, side for side and end for end. In all cases the keys 48 and 50 have interlocking relation with the head and with the shank and it is contemplated that suitable means may be provided for fastening the keys in place, cotter pins being generally preferred. As a result of the bottom closure member 31 the bottom opening in head portion 22 is completely closed and thus the end portion of the shank is fully protected against wear.

In the modification of Figures 12 to 15 inclusive the shank 60 is provided with a terminal end portion 61 which has a shape in section of a Maltese cross, as is evident from an inspection of Figure 13. The four side wall projections which comprise the arms of the cross are identified by numerals 62, 63, 64 and 65. The side projections 62 and 64 each have a groove therein such as 66 and 67, respectively, the grooves extending horizontally across the face of the projections and said grooves being adapted to receive keys which are inserted therein for releasably attaching to the terminal end of the shank hammer head 68 which will now be described in detail.

Said hammer head is substantially symmetrical with respect to vertical and horizontal axes. Accordingly, the top surface 70 is rounded on the same arc as the bottom surface 71, and the face 72 on the left side is the same size and shape as face 73 on the right side. A passage 74 extends vertically through the head from the top surface 70 to the bottom surface 71, the formation of the passage being symmetrical with respect to horizontal and vertical lines, and said passage being constructed and arranged to provide supporting ledges adjacent the top and bottom openings of the passage for supporting a closure member 75. The said openings 76 and 77 in the head are located in the top and bottom surfaces, respectively, and each has the shape of a Maltese cross and is a size to accommodate the terminal end of the shank. Within the head the passage is enlarged being formed substantially square in shape, the enlargement identified by numeral 78 providing the shoulders or ledges for supporting the bottom closure member 75. Accordingly, at each corner of the square enlarged area within the head a ledge is provided for said member, the top ledges being identified by numeral 80 and the bottom ledges by numeral 81.

The shape of the bottom closure member is best understood by reference to Figures 13 and 14. The flange or supporting portion 82 of the member 75 is approximately square and of a size the same as said enlarged area in horizontal cross section. Thus the flange portion rests on the corner ledges at either the top or the bottom of the enlarged passage and is supported thereby. Figure 14 shows the flange portion 82 resting on the bottom ledges 81 and which thus locates the extension or bottom portion 83 of the closure member within the opening 77 in the bottom surface of the hammer head.

It will be understood that the said extension has the shape of a Maltese cross and is of a size to be received by either the top or bottom opening.

After the bottom closure member has been inserted through the opening 76 of the hammer head and has passed through the enlarged area so as to enter the bottom opening 77, whereby the respective shoulders or ledges 81 support the bottom closure member, it is contemplated that the hammer head 68 will be assembled on the end 61 of the hammer shank. This modification of the invention also employs interlocking keys for interlocking the hammer head to the terminal end of the shank. The keys 85 and 86 are rectangular in cross section and their length is such that they extend horizontally through openings 87 and 88 for the full length of said openings from side wall 90 to side wall 91. The said openings are formed in head portion 68 and are located on the horizontal center line of said head portion so that the hammer head may be reversed on the shank. Thus, irrespective of which surface 70 or 71 is top or bottom, the said openings will align with the grooves 66 and 67 provided therefor in the terminal end 61 of the shank. Figure 12 shows the keys 85 and 86 in place so as to lock the head portion to the shank end, and Figure 13 illustrates the manner in which the keys have interlocking relation with the grooves and with the openings. Groove 66, formed in projection 62, receives the key 85 inserted in opening 87, whereas groove 67, formed in projection 64, receives the key 86 inserted in opening 88. It is contemplated that suitable means may be provided for fastening the keys in place, cotter pins such as 92 being generally preferred. In order to accommodate the cotter pins the side walls 90 and 91 at respective ends of the keys are vertically recessed as at 94.

The hammer head of the invention has a central passage extending therethrough of a special shape for accommodating the terminal end of the shank. Also in accordance with the invention, the passage is enlarged within the head in order to provide shoulders or ledges for supporting the bottom closure member. Accordingly, during operation the end of the shank is covered and protected against wear although the head can be readily removed from the shank and reversed side for side and end for end so as to render available for use all impact edges.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. A rotary hammer of the character described comprising a shank having one end adapted to be pivotally mounted, the other end of the shank having a special shape for receiving a hammer head, a head having a passage therethrough of a size and shape complementary to that of the shank end, said shank end having grooves formed in opposed walls thereof and said head having laterally extending openings therein communicating with the passage and aligning with the grooves respectively in the shank end when the parts are in assembled relation, and a plurality of keys adapted for insertion in the aligned openings and grooves for releasably retaining the hammer head in assembled relation on said shank end.

2. A rotary hammer of the character described comprising a shank having one end adapted to be pivotally mounted, the other end of the shank having a special shape for receiving and mounting a hammer head, a substantially rectangular head having a passage therethrough of a size and shape complementary to that of the shank end, opposite walls of the shank end each having a groove extending laterally and at right angles to the length of the shank, said hammer head having laterally extending openings therein intersecting the passage and aligning with the grooves respectively in the shank end when the parts are in assembled relation, and a plurality of keys adapted for insertion in the aligned openings and grooves for releasably retaining the hammer head in assembled relation on said shank end.

3. A rotary hammer of the character described comprising a shank and a hammer head releasably fixed to the shank, said shank having an end portion, opposed walls of which are each provided with a groove, said hammer head having impact surfaces at respective ends, side surfaces, and top and bottom surfaces, the top and bottom surfaces of said head having openings therein providing a passage through the head having a size and shape complementary to that of the shank end portion, the side surfaces of the head each having a pair of openings therein, extending laterally to intersect the passage and aligning with the grooves respectively when the parts are in assembled relation, and a pair of keys adapted for insertion in the aligned openings and grooves respectively for releasably retaining the hammer head in assembled relation on said shank end portion.

4. A rotary hammer of the character described comprising a shank and a hammer head releasably fixed to the shank, said shank having an end portion, certain opposed walls of which are each provided with a transverse groove, said hammer head having impact surfaces at respective ends, side surfaces, and top and bottom surfaces, a passage extending through the head from top to bottom surface thereof and said passage having a size and shape complementary to that of the shank end portion, transverse openings in the head extending from one side surface to the other, said openings intersecting the passage and aligning with the grooves respectively when the head is assembled on the shank end, and a pair of keys adapted for insertion in the aligned openings and grooves respectively for releasably retaining the hammer head in assembled relation on the shank end portion.

5. A hammer for rotary mills and the like comprising a head portion substantially rectangular in shape and having top and bottom surfaces, side surfaces, and end impact surfaces, said head portion having a passage of special shape extending centrally through the head from top surface to bottom surface, a hammer shank providing an end portion of the same cross-sectional shape as the passage and adapted to fit in the passage for mounting the head on the shank, said shank end portion having a groove in certain opposed side walls in right angle relation to the length of the shank end portion and adjacent the terminal end thereof, the head portion having openings therein extending from one side surface to the other and intersecting the central passage, keys adapted for location in the openings and grooves when in alignment for releasably retaining the head portion on the shank end portion, and a bottom closure member located within the central passage below the shank end portion for closing the opening to the central passage in the bottom wall of the head portion.

6. A hammer for rotary mills and the like comprising a head portion substantially rectangular in shape and having top and bottom surfaces, side surfaces, and end impact surfaces, said head portion having a passage extending centrally through the same from top surface to bottom surface, said passage having a shape to form openings in the top and bottom surface which simulate a conventional I, and said passage being enlarged in a transverse direction within the head between the top and bottom openings whereby to form supporting ledges, a hammer shank of the same cross sectional shape as the top and bottom openings in the head portion and adapted to fit in the passage for mounting the head on the shank, said shank having a groove in certain opposed side walls in right angle relation to the length of the shank, the head portion having openings therein extending from side surface to side surface and intersecting the central passage and disposed in alignment with the grooves when the parts are in assembled relation, a pair of keys adapted for insertion in the aligned openings and grooves respectively for releasably retaining the head portion on the shank, and a bottom closure member for protecting the terminal end of the shank, said closure member being located within the passage and being supported on supporting ledges provided for the purpose, and said closure member closing the bottom opening in the head portion.

7. A hammer for rotary mills and the like as defined by claim 6, additionally including cotter pins for locking the keys in place, wherein each side surface of the head portion is provided with channels intersecting with the openings for accommodating the cotter pins, and wherein said head portion is symmetrical with respect to both horizontal and vertical center lines.

References Cited in the file of this patent

UNITED STATES PATENTS

| | | |
|---|---|---|
| 1,928,516 | Van Buskirk | Sept. 26, 1933 |

FOREIGN PATENTS

| | | |
|---|---|---|
| 484,212 | Germany | Oct. 12, 1929 |
| 572,303 | Germany | Mar. 14, 1933 |
| 703,371 | Germany | Mar. 7, 1941 |